(12) United States Patent
Lerner et al.

(10) Patent No.: US 11,778,586 B2
(45) Date of Patent: Oct. 3, 2023

(54) CONNECTED VEHICLE DATA OFFLOAD MANAGEMENT

(71) Applicant: FORD GLOBAL TECHNOLOGIES, LLC, Dearborn, MI (US)

(72) Inventors: Jeremy Lerner, Southfield, MI (US); Ali Abdallah, Dearborn, MI (US); Taylor Hawley, Oak Park, MI (US); Scott Huggins, Novi, MI (US); Xingping Chen, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 17/488,652

(22) Filed: Sep. 29, 2021

(65) Prior Publication Data

US 2023/0096556 A1   Mar. 30, 2023

(51) Int. Cl.

| | |
|---|---|
| *H04W 64/00* | (2009.01) |
| *H04W 84/18* | (2009.01) |
| *H04W 4/44* | (2018.01) |
| *H04W 76/19* | (2018.01) |
| *H04W 76/15* | (2018.01) |

(52) U.S. Cl.
CPC ........... *H04W 64/006* (2013.01); *H04W 4/44* (2018.02); *H04W 76/15* (2018.02); *H04W 76/19* (2018.02); *H04W 84/18* (2013.01)

(58) Field of Classification Search
CPC ..... H04W 64/006; H04W 76/19; H04W 4/44; H04W 76/15; H04W 84/18
See application file for complete search history.

(56) References Cited

U.S. PATENT DOCUMENTS

| | | | |
|---|---|---|---|
| 8,995,956 | B2 | 3/2015 | Lavi et al. |
| 10,643,285 | B1* | 5/2020 | Tofte ................... G06Q 30/0201 |
| 2014/0012494 | A1* | 1/2014 | Cudak ................ G01C 21/3415 |
| | | | 701/465 |
| 2014/0274048 | A1 | 9/2014 | Lavi et al. |
| 2016/0219251 | A1 | 7/2016 | Vare et al. |
| 2018/0098227 | A1 | 4/2018 | Carnelli et al. |
| 2019/0052914 | A1* | 2/2019 | Anderson ......... H04N 21/25841 |
| 2020/0039361 | A1* | 2/2020 | Geller .................... H02P 29/032 |
| 2020/0211382 | A1* | 7/2020 | Lu ........................... G08G 1/087 |
| 2020/0272163 | A1* | 8/2020 | Ha .......................... G06V 10/82 |
| 2022/0060657 | A1* | 2/2022 | Otaka ................... H04N 21/812 |

\* cited by examiner

*Primary Examiner* — Ernest G Tacsik
(74) *Attorney, Agent, or Firm* — Joseph Zane; Brooks Kushman P.C.

(57) ABSTRACT

A vehicle determines that a stop is upcoming along a route and determines that the upcoming stop will place the vehicle within range of a wireless transceiver. The vehicle approximates a predicted transfer rate of the wireless transceiver and determines if data onboard the first vehicle is to be uploaded, based on at least a size of the data, a priority assigned to the data and the predicted transfer rate. Additionally, the vehicle determines a predicted duration of communication between the vehicle and the transceiver based on the route and the upcoming stop, allowing the vehicle to determine a first predicted amount of data able to be transferred. The vehicle designates first data for upload, based on the first data having a size that is below the first predicted amount and begins transferring the designated data responsive to establishing communication with the wireless transceiver.

20 Claims, 6 Drawing Sheets

CONNECTED VEHICLE DATA OFFLOAD MANAGEMENT

TECHNICAL FIELD

The illustrative embodiments relate to systems and methods for connected vehicle data offload management.

BACKGROUND

Vehicles are becoming increasingly connected, to each other, to the cloud and to local infrastructure. Using a variety of wireless communication mediums, vehicles can establish communication with a plurality of varied entities. Collectively, vehicles with such capability may be referred to as connected vehicles.

At the same time, vehicle sensing capability is increasing with cheaper and more abundant sensors being continually installed in vehicles. This sensing capability may increase significantly with regards to autonomous vehicles, which rely on sensors, instead of driver senses, to manipulate a vehicle. Such vehicles also require advanced connectivity to continually share and receive information relating to the present and upcoming driving environment.

Both autonomous and human driven vehicles can benefit from information sharing, however, the number of sensors, number of vehicles with communication capability, and limitations on bandwidth of available connection points may make it difficult for all vehicles to share information as soon as it is obtained. Even cellular bandwidth could become congested if all vehicles attempted to share information at once, not to mention the potential cost of sending so much data over a cellular network. Installation of additional access points could reduce this burden, but more needs to be done, given the possibility of millions of connected vehicles seeking to share information on as continual a basis as possible or practicable.

SUMMARY

In a first illustrative embodiment, a system includes a processor configured to determine that a stop is upcoming along a route of a first vehicle. The processor is also configured to determine that the upcoming stop will place the first vehicle within range of a wireless transceiver and approximate a predicted transfer rate of the wireless transceiver. The processor is further configured to determine if data onboard the first vehicle is to be uploaded, based on at least a size of the data, a priority assigned to the data and the predicted transfer rate. Additionally, the processor is configured to determine a predicted duration of communication between the first vehicle and the transceiver based on the route and the upcoming stop and determine a first predicted amount of data able to be transferred based on the predicted duration and the predicted transfer rate. The processor is configured to designate first data for upload based on the first data having a size that is below the first predicted amount, responsive to determining that data is to be uploaded and begin transferring the designated data, responsive to the first vehicle establishing communication with the wireless transceiver.

In a second illustrative embodiment, a first vehicle includes a processor configured to wirelessly receive route data from a second vehicle indicating both a shared portion of an upcoming route of the first vehicle and a deviance, after the shared portion, from the upcoming route. The processor is further configured to determine, based on the received route data, that the deviance will bring the second vehicle within communicable range of first known wireless transceiver sooner than the first vehicle will come within communicable range of a second known wireless transceiver. The processor is also configured to wirelessly transfer data, designated for upload, from the first vehicle to the second vehicle responsive to the determination.

In a third illustrative embodiment, a system includes a processor configured to determine that a first vehicle includes first data designated for upload. The processor is also configured to determine that a first and second vehicle will travel in communicable proximity to each other for at least a duration sufficient to wirelessly transfer the first data from the first vehicle to the second vehicle, based on route data of the first and second vehicles. Further, the processor is configured to determine that the second vehicle will travel within communicable range of first known wireless transceiver sooner than the first vehicle will come within communicable range of a second known wireless transceivers, based on the route data, and responsively instruct the first vehicle to transfer the first data to the second vehicle when the first vehicle is within communicable proximity to the second vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Vehicles of all types benefit from increased information about traveled routes. Since many vehicles, especially autonomous vehicles, will come equipped with a variety of cameras and other sensors, a great deal of information can be gathered about the roads (e.g., weather, traffic, construction, potholes, etc.) while vehicles travel. This data may be significant in both volume (over time) and size, as well as being gathered by potentially millions of vehicles.

While it is beneficial to have such significant information, the cost of relaying such data exclusively through cellular networks can become prohibitively expensive for a data-gathering entity. Moreover, such relay could overwhelm a network, especially during peak travel times, rendering the network crippled for general calls and internet usage (e.g., using a smartphone). To address this, a variety of existing and planned infrastructure elements may be utilized to relay the data over wireless transfer using, for example Wi-Fi transfer, which should not impede the cellular networks.

Even these locations, be they deployed hotspots or businesses having open hotspots or data-gathering agreements, may become overwhelmed by large volumes of transferred data. This can result in limiting available bandwidth, delaying transfer of all data, and rendering the hotspots unusable for on-site customers in the case of businesses.

Moreover, simply because a hotspot is the next available hotspot does not mean it is the best available hotspot on a route. A business or hotspot placed nearby a highway offramp may be a prime candidate for usage by vehicles exiting the highway, but a high volume of such vehicles attempting to use the hotspot at one time may render the performance significantly slowed. At the same time, an available hotspot a mile away, by which many of the vehicles may still pass, may be virtually unused and represent a much better option for absorbing some of the usage of the near-highway hotspot.

Vehicles may also carry a variety of sensor data and information of different sizes. While this data could be assigned a priority for transfer, much of the data may have the same priority, and further, some of the larger data sets may not be useful until fully transferred. Accordingly, if a vehicle is only going to be in proximity to a hotspot for the duration of a traffic light cycle, it may be better to have the vehicle upload a smaller, but complete, lower-priority dataset, as opposed to simply a portion of a higher priority set. This also will help absorb some bandwidth usage and take the burden off of more frequently used hotspots, allowing vehicles to leverage appropriate hotspots in appropriate manners.

Many times, a vehicle will not know of the existence of a hotspot, or will not know, in advance, whether a hotspot is currently overwhelmed with traffic. Planning data transfers in advance of connection may save valuable time and ensure efficient transfer of information, but planning may require some advanced knowledge about the hotspot. The illustrative embodiments and the like provide a number of planning, transfer and evaluation processes that help keep a massive network of perpetual data flowing in a manner that is much more efficient than simply using whatever hotspot the vehicle happens to detect at the moment. This will also incentivize business participation, if business owners can have some assurances that the planning will be such that their personal networks will not be overwhelmed with transfer requests in certain instances (e.g., without limitation, during peak travel hours). Such a system can also coordinate a number of vehicles, having advanced knowledge about which hotspots a vehicle will encounter, so that the vehicle does not always need to use the next-available hotspot if another option is along a route. Thus, priority can be given to vehicles that may encounter fewer hotspots, improving aggregate data transfer while mitigating the impact of a large number of vehicle transfer requests.

Figure 1:
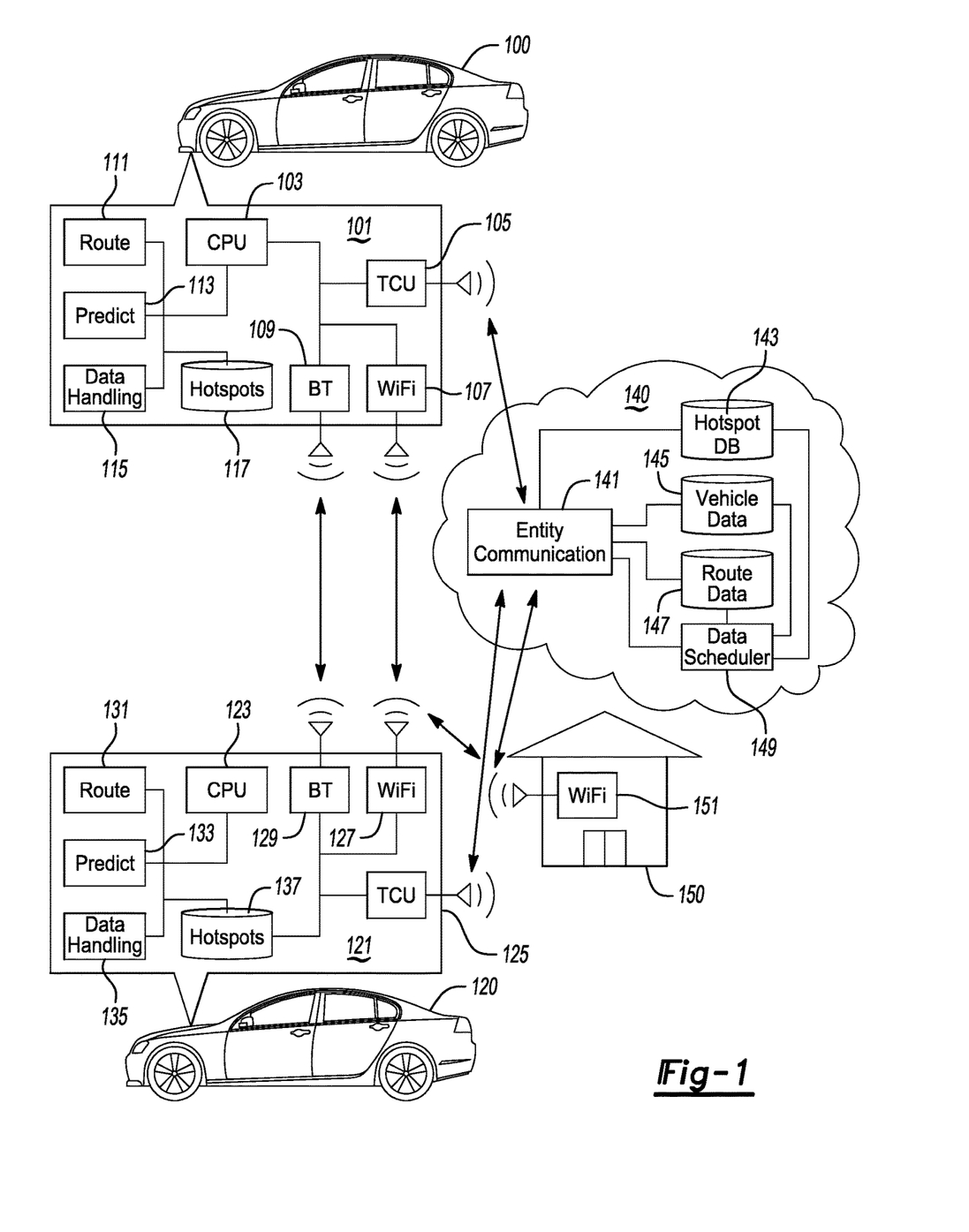
FIG. 1 shows an illustrative example of a multi-connected-vehicle system in communication with the cloud and local infrastructure.

FIG. 1 shows an illustrative example of a multi-connected-vehicle system in communication with the cloud and local infrastructure. In this example, the vehicles 100 and 120 represent connected vehicles, which are vehicles that include a connection to a backend server or servers maintained on behalf of a data-gathering and/or providing entity, such as an original equipment manufacturer. An example of processes that may be enabled by backend connections are shown as cloud 140.

Vehicles 100, 120 include an onboard computing system 101, 21 that has one or more processors 103, 123 in connection with a variety of vehicle components, sensors, modules, memory and software and other vehicle elements. A telematics control unit (TCU) 105, 125 provides a cellular connection to the cloud 140, when necessary, as well as onboard infotainment and connectivity options.

Wi-Fi transceivers 107, 127 can connect to infrastructure networks (e.g., dedicated short range connection (DSRC) transceivers) or other Wi-Fi enabled infrastructure elements. For example, connected traffic signals may report their state change plan wirelessly, to allow vehicles 100, 120 to plan acceleration or slowdown on approach, based on a projected light state change. This information may also be broadcast via BLUETOOTH or other short wireless communication, and can be received by BLUETOOTH transceivers 109, 129 onboard the vehicle 100, 120. The Wi-Fi and BLUETOOTH transceivers can also be used to exchange information between the vehicles 100, 120, as will be discussed in greater detail herein.

The vehicles may also include, for example, routing process 111, 131 which can define a destination or route. If the vehicle is driven by a person, it may not always have a route, but if the vehicles 100, 120 are autonomous, they will always be headed somewhere. The vehicle may also include applications and onboard software such as prediction processes 113, 133. These processes can represent machine-learning processes that are capable of making predictions about where a vehicle may be headed, the states of a Wi-Fi network, etc. While not necessary, prediction processes generally represent a group of one or more "smart" applications onboard a vehicle that can learn from historical data and act to improve both the functioning of other vehicle systems and the driver/occupant experience. Also, in this example, the vehicles may include data handling processes 115, 135, which work to decide which data to upload and when to upload the data, as well as planning data transfers in advance of an opportunity, replacing stale data with newer data, etc.

Both vehicles 100, 120 may communicate with each other as shown, or may communicate with the cloud 140 or local infrastructure 150. For example, as shown, a local business 150 may include an onsite Wi-Fi network enabled by one or more access points 151. Vehicles 100, 120 may be given limited free access, or OEMs may work out arrangements with these businesses when more aggressive use of the network is needed. Of course, a business is free to leave the network open for as much use as desired, but a business proximate to a heavily traveled route, where vehicles 100, 120 are enacting the illustrative embodiments and the like, may find their network quickly overwhelmed in certain instances.

In this example, the vehicles 100, 120 communicate with an entity communication process 141, which is a gateway or other process responsible for handling cloud to vehicle communication. When another backend process has a vehicle request or instruction, or wants to receive data from a vehicle, the gateway process 141 may facilitate the necessary communication. This is merely an example of one of many processes that could facilitate cloud to vehicle communication.

The backend 140 may also store a database of hotspot information 143, which can include, for example, locations, arrangements for data transfer, permissions/credentials that can be shared with vehicles, typical bandwidth speeds, historical/present/expected usage data (e.g., typical usage/current usage/planned usage) and other information pertinent to planning which hotspots to use and when.

The backend may also have route data 147 for a plurality of vehicles, which indicates which vehicles are going where, allowing for planning of data handoffs as well as planning for hotspot usage in advance of arrival. It may be difficult for a single vehicle to plan which hotspots to use until the vehicle is connected, but when the backend knows the travel plans of hundreds or thousands of connected vehicles, it may be better equipped to coordinate efforts. Vehicles may have some onboard capabilities so that they can plan data transfer in the absence of the backend, but in this example the backend is also capable of tracking vehicle 100, 120 locations and assisting in data transfer planning.

The backend may also have a repository of vehicle data 145. This can include, for example, connection capabilities and general information on individual vehicles. The route data may include specific routes for known vehicles, and the vehicle data 145 may include general vehicle information (makes, models, software, sensors, capabilities, etc.). Both sets of information may serve a purpose, as discussed herein, and vehicle data may also include route data as appropriate (e.g., the data sets may be stored in a single data repository).

Finally, in this example, the backend includes a data selector and planning process 147. This process may receive information from vehicles 100, 120 about what data is available for transfer and can decide the criticality of a given item of data. Data may have a general priority associated therewith, based on a type of data, for example, allowing for onboard planning and general ordering of data when limited transfer windows are available. At the same time, certain data may be more critical based on an immediate need or information contained in the data. Vehicles 100, 120 may send a signal indicating what types of data they have or have just gathered, which may be limited in size to accommodate the cellular network. Based on these indicators, the backend may be able to determine which data is immediately needed, or which data should have a short-term higher priority, and can respond to the vehicles 100. 120 with instructions to send the relevant data.

Figure 2:
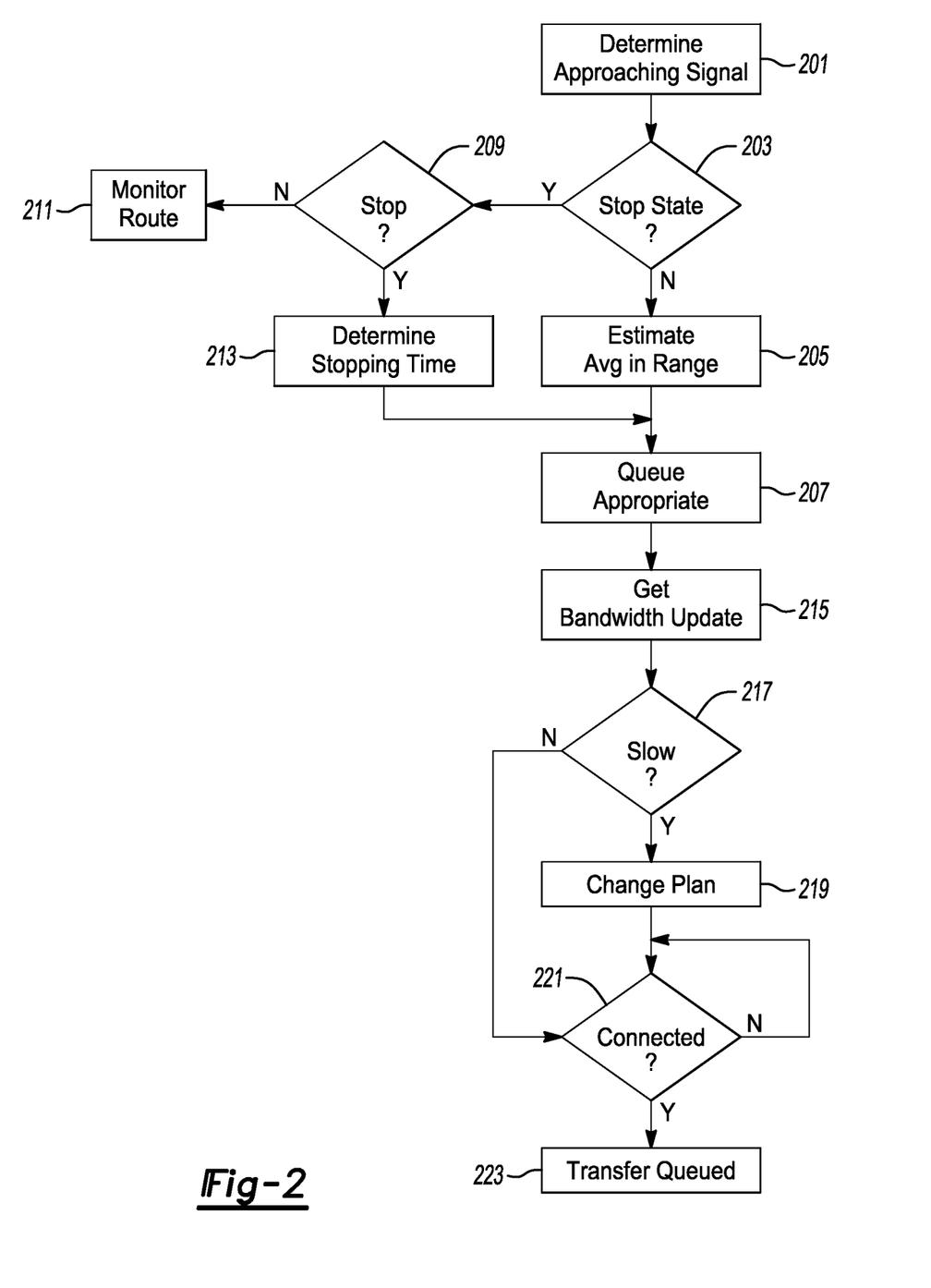
FIG. 2 shows an illustrative data preparation and transfer process.

FIG. 2 shows an illustrative data preparation and transfer process. In this example, a vehicle 100 may determine that it is approaching a signal at 201. This may be determined based on the known presence of a signal (indicated by map data, for example, or by the backend), based on communication from a connected signal indicating where it is located, indications from another vehicle 120 in a vehicle to vehicle (V2V) relay, etc. In this example, there is also a known Wi-Fi access point in proximity to the signal (or included as part of the signal, if the infrastructure includes this capability).

Some signals are and will be connected signals, which convey information about the signal to a network and/or vehicles 100, 120, in order to assist in maneuvering proximate to the signal. Such signals, for example, may convey when they will next change state, when they will change state to red/yellow/green, how long they will maintain a present state, the nature of the present state, etc. Thus, in a network where this information is available for signals along a route, a vehicle 100 may know well in advance of signals which signals it will encounter. If the signals run on regular schedules, the vehicle 100 will know at which times the signal will be red, and for how long. Thus, as the vehicle 100 approaches, it will be able to determine, with reasonable accuracy, for how long it will be stopped. If there is a proximate Wi-Fi access point that will be in range for some or all of the duration of a stop, the vehicle 100 may know this (or be informed of this by the backend or another vehicle) and may recognize an opportunity to transfer data.

In the instances where the signal is connected, or where the vehicle 100 has other information about whether the stop state is known or knowable at 203, the vehicle 100 will determine if a stop is likely at 209. If the stop state is not known at 203, the vehicle 100 will estimate average time(s) in rage of the known Wi-Fi access point. That is, even if the vehicle 100 does not stop, it may be in range of the access point for some number of seconds at least, depending on road-speed and traffic. This may be sufficient time to transfer small amounts of data, if doing so would not unreasonably burden the access point and prevent more efficient usage by another vehicle (e.g., a vehicle 120 already stopped as cross-traffic). The vehicle 100 may also estimate how long it will be in range of the Wi-Fi at 205 if the vehicle 100 is actually stopped.

For example, if a vehicle is approaching a signal with fully connected information, the vehicle 100 may be able to determine the actual state of a stop and how long the vehicle 100 will be in range of the access point, with good accuracy. If there is historic information stored about a non-connected signal, that information may be sufficient for the vehicle 100 to make a comparable determination or a good estimate. If the historic information indicates that the light is always red at 5:00 PM, and changes in precise 30 second intervals, then the vehicle 100 can extrapolate based on a current time of day. Lights tend to change cycles, but if sufficient data is known, the cycles may be predictable. In another example, the cycle may be consistently timed, over a certain range of a day, but the precise times-of-change may not be known. Another connected vehicle 120 may observe a state change and convey that information to the backend 140. At that point, the backend 140 may know the cycle timing and have a data-point for an observed change, which should let the backend 140 determine that day's change times, until the state change timing changes. So, based on this data, vehicle 100 may still know when the light will change state, and for how long it will remain, for how long connected vehicles can communicate using V2V, etc.

In still a further example, there may be no such information available, either for a lack of historical data or a lack of present state-change data. In that instance, the vehicle 100 may have to make some estimates based on whatever information is available and general knowledge about signals or signals along that route or in the area. Accordingly, in such an instance, the vehicle 100 will estimate one or more expected times in range of the Wi-Fi signal and may queue (or designate with priority) one or more data sets for transfer at 207. This can include designating a first set if there is a stop and a shorter set if there is no stop, and can include a reordering of initial priorities to newly assigned temporary transfer priorities for the instance of the upcoming encounter with the Wi-Fi access point.

The vehicle 100, which itself is connected, may request information about the present bandwidth of the upcoming access point. This can be obtained from the backend 140 or from V2V relay from vehicle 120. This can also be historical data about bandwidth availability at an expected encounter time, if present data is not available.

If the access point is running too slowly at this moment at step 217, the vehicle 100 may elect to change a priority plan at 219, which can include, for example, reprioritizing smaller data sets for transfer, since transfer will likely take longer, and/or designating no transfer of files if the vehicle 100 does not stop. That is, recognizing that the access point is already overburdened, the vehicle 100 may elect not to try to push through additional data if the vehicle 100 is traveling by the point without stopping, which can help prevent slowing down the transfers of other data. The vehicle 100 may also elect to attempt upload of a smaller, previously lower-priority data set, since that may represent a maximum amount of data likely to be transferred based on the expected speed of the transfer and the expected duration of a stop, should one occur.

Additionally or alternatively, the vehicle may alter a route to bring it in proximity to a different, less burdened Wi-Fi access point. Since may route alternatives add insignificant time to a journey—e.g., to traverse a city block from one corner to an opposite corner, one could go along either pair of adjacent sides leading to the next corner in many instances—minor reroutes may add no or insignificant time. At the same time, they can avoid overburdened transceivers, distributing payload and transmission with nominal to no impact on a driver or occupant.

Once the vehicle 100 is connected at 221, it will transfer the designated data at 223 in accordance with, in this example, a vehicle state (stopped or not-stopping) that exists at time of connection, or shortly thereafter.

When the vehicle 100 knows the state cycle of the light at 203, either based on sufficient data to make a prediction or based on a connected signal, the vehicle 100 can determine whether a stop will occur at 209. In this example, if a stop does not occur, the vehicle 100 simply resumes route monitoring for a next-point to transfer, however the "passing by" transfer previously discussed, where the vehicle 100 does not stop but does transfer data, can also be planned.

If the vehicle 100 will stop at the light at determined at 209, the vehicle 100 will determine the likely stopping time at 213, which, in this instance, is likely to be more accurate than the estimate made at 205. The vehicle 100 can then take similar measures as before, determining the bandwidth available and adjusting any transfer plans accordingly. Even if the bandwidth is low, it may be easier for vehicle 100 to adjust plans in this instance, since it has access to better information about the signal, and can more accurately determine what can be transferred based on stopping time combined with the presently indicated bandwidth. Stops may also include congested stop-sign intersections, where vehicles move in one-vehicle bursts and take significant time to clear. Delivery vehicles doing curb-side pickup may also have known or projected stopping times at certain locations (e.g., restaurants). Any information about a stop likely to occur within a certain, usable distance of an available transceiver may be used as a predicate for planning transfers.

Figure 3:
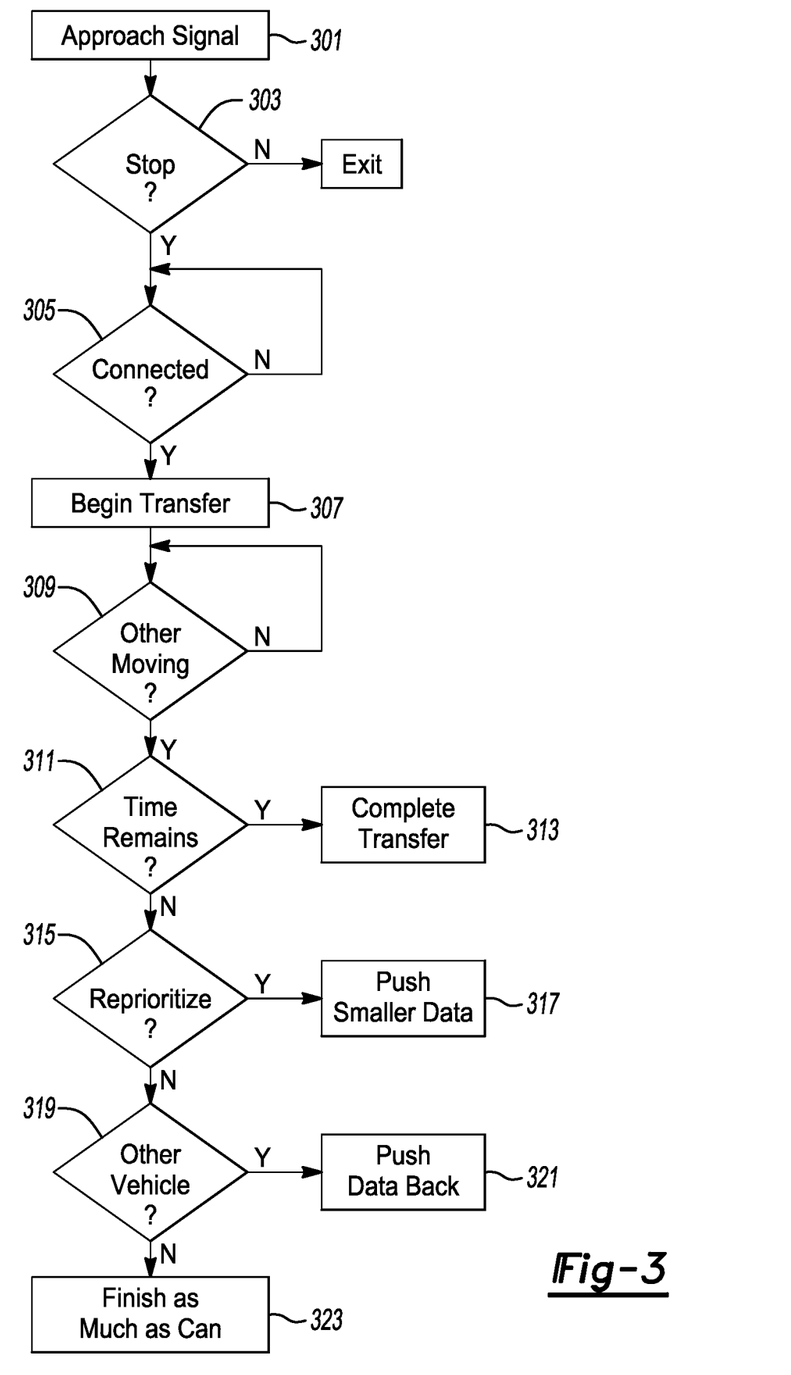
FIG. 3 shows an illustrative example of a data transfer planning process for an approaching connection with a stop.

FIG. 3 shows an illustrative example of a data transfer planning process for an approaching connection with a stop predicted/known and a Wi-Fi access point in proximity. This example shows how the vehicle 100 can dynamically adapt a transfer process to accommodate changing circumstances.

Here, the vehicle 100 approaches the signal at 301 and determines if there will be a stop at 303. When there is not stop, in this example, there is no transfer, to preserve bandwidth for other vehicles 120 that may be stopped or stopping and which may thus be able to take better advantage of the access point.

If there will be a stop, determined at 303, the vehicle 100 waits until it is connected to the access point at 305. In this example, if there was a plan made for initial transfer, it may have been made in advance as shown in the non-limiting example of FIG. 2. This example shows what can happen once the vehicle 100 approaches the light and comes in range of the Wi-Fi access point, even if a plan was made prior to connection.

Once the vehicle 100 is connected, it may begin transferring information at 307, in accordance with whatever initial prioritization plan was made, or based on a predefined set of priorities associated with stored data, if no advance planning occurred. Predefined priorities may rank data based on time, recency, location where obtained, etc. In other examples, the vehicle 100 may resort to a FIFO or LIFO queue, or even random transferring, when no priorities exist otherwise and no plan has been made. Other possible general strategies include smallest-first, largest-first, etc.

While the vehicle 100 in this example continues to transfer data in accordance with the predicted stop, it can receive notification from a connected vehicle 120, that is closer to the light, that vehicle 120 has begun moving. In most instances, vehicle 100 will not be the first vehicle in line at a light, and so the duration of a stop is actually the duration of the light plus the amount of time it takes all preceding vehicles to move. Thus, the actual time in range of the network will be (assuming the initial stop occurs in range), duration of stop+delay in moving because of other vehicles+duration in range while traveling after stop. So, if the network covers 120 feet of roadway along an intersection, and the vehicle stops for 30 seconds, with 6 preceding vehicles, each of which take 2 seconds to move after the light change, and the vehicle 100 is also along the stretch of 120 feet for 10 additional seconds after moving, the duration would be 30+12+10 or 52 seconds, which is ~70 percent more than the duration of the stop alone.

Since vehicle 100 has onboard and backend advanced planning, and some knowledge of historical data, it may be able to generalize about the expected duration in range and movement times, and so would, in this instance, have planned some data transfer based on some expected number (e.g., average) of intervening vehicles and some duration of travel in range. For example, the vehicle 100 may have predicted that there would be eight intervening vehicles and that each vehicle would take approximately 2.3 seconds to move, as well as a duration of 12 seconds along the in-range portion of the route after movement, plus the 30 second stop. The vehicle 100 would have predicted that 59.4 seconds would be available, but in actuality would only get 52 seconds if the preceding example were the real case experienced. Thus, the vehicle 100 may have planned for a file transfer projected to take 57 seconds, but will now not be in range sufficiently to transfer the whole file.

When vehicle 100 stops, it may be closer to the light than expected, based on the GPS location of vehicle 100 relative to the light. That is, the distance between vehicle 100 and the intersection will not equal at least eight average car lengths. This is an opportunity for vehicle 100 to adjust a strategy, depending on how close the vehicle 100 is located. Vehicle 120 moving at 309 is also an indication that the line will move, and can be used to adjust the transfer and determine if sufficient time remains for a present data set transfer to be completed.

While a transfer of a larger file may be interruptible and resumable at a later point, with a portion of the data stored on the backend, the backend may also not be able to use the data until the whole file has been transferred. So, in this instance, when the vehicle 100 determines that insufficient time remains at 311, it may adjust a transfer plan. It can always elect to complete the transfer at 313, whether or not time remains, and may just end up transferring 90% of the file, with the remaining 10% to be completed later. On the other hand, the vehicle may be instructed to transfer whole, usable data when possible, and recognizing that the predicted time available is less than expected, it may reprioritize the data transfer at 315.

If it does elect to reprioritize the transfer, it may upload a smaller data set at 317, that is projected to be uploadable within a new prediction about how much time in range of the access point remains. If it does not reprioritize (e.g., if it continues the transfer of the original, too large file), it may attempt to determine if there is another vehicle in line behind it, which represents a vehicle that may have additional time within range of the access point relative to vehicle 100. This could be additional total time or additional time if the object vehicle is in range but the rearward vehicle is not—e.g., the rearward vehicle will eventually move forward to be within range of the access point, and should remain in range at least slightly after the forward vehicle drops the connection due to range. If there is no other vehicle, the vehicle 100 may simply finish as much of the transfer as possible at 323 and assign a high priority to the remainder of the data so that the file can be completed as soon as next-possible. If a small enough amount of data remains, the vehicle 100 may simply use the TCU 105 to complete the transfer of the file.

If there is another vehicle in range, that is located behind the vehicle 100, the vehicle 100 may send the remainder of the data, or a projected remainder, to the other vehicle. The other vehicle will then upload this remainder for as long as it is within range, which will potentially complete the transfer using two vehicles. The other vehicle does not necessarily have to be behind vehicle 100, provided vehicle 100 can begin sending a portion of the file to the other vehicle using a different communication medium while the upload is ongoing, so that the other vehicle has time to also transfer the received portion. The other vehicle may also reject the assistance request if it has its own data needing transfer.

If the vehicle 100 projects it can complete 75% of the file, it may elect to send the last 35% of the data to the other vehicle while uploading as much as it can. The other vehicle can receive this data and being uploading it immediately. This may result in some overlap of received data, but the backend should be able to sort out the overlap. The file may be broken into discrete portions and a certain number of portions can be shared with the other vehicle, and all the data may be encrypted and still reassembled after decryption by correct reassembly of the packets. The second vehicle may simply act as a passthrough without imposing its own encryption, if it receives data already encrypted by vehicle 100. Whether the second vehicle is ahead of or behind the vehicle 100, this sharing process could occur. If the second vehicle is behind vehicle 100, vehicle 100 may elect to wait longer before sharing data, depending on how far behind the second vehicle is located. For example, if the second vehicle is autonomous as well (and thus not subject to someone rushing through a light that is changing red), vehicle 100 may accurately predict that the second vehicle will not make the current green light cycle (or other projected stopping predicate). Accordingly, it will have a much longer duration in range of the access point, even if it does not presently have access due to being out of range.

Both vehicles will travel forward as the light changes green, and at some reasonable point vehicle 100 can send remaining data to the second vehicle over a direct V2V connection. The second vehicle can then use the additional time at the light to complete the transfer, since it will sit through another light cycle and, at that point, be in range of the access point.

Whether any of the preceding conditions are true or not is more easily discernable based on the more information that is available to assist a given vehicle 100. That is, if all vehicles are autonomous and the backend has relatively complete information about signal cycles, routes, and vehicle locations, the above sharing is less of a prediction and more of a plan.

On the other hand, while only limited portions of the preceding predictive data are known, the vehicle or backend can at least attempt a prediction and act in accordance, recognizing that it may be incorrect. Accommodation can be made, however. For example, if the backend 140 is in communication with vehicle 100, it can inform vehicle 100 if the remainder of the data was ever received. Vehicle 100 can preserve the rest of the data until such indication is received and plan a later transfer if the second vehicle failed to transfer the data. If the indication indicates that the remainder of the data was successfully received, vehicle 100 can delete the remaining portion of the data.

It is worth noting that even if vehicle 100 reprioritized the data at 315, and elected to send smaller data set(s) at 317, the vehicle 100 could also search for one or more other vehicles to assist in completing the transfer of the other, original file. Vehicle 100 may even share different portions with multiple proximate vehicles, if all of those other vehicles have nothing else to transfer, since each other vehicle may be able to upload a portion of the original (or other) file as they all concurrently pass the access point, assuming the access point can bear the load of the concurrent requests.

The immediately preceding example may be a way for an autonomous vehicle, which may have very advanced sensing, to leverage a number of less sophisticated human-driven, but still connected, vehicles, while at a light. The autonomous vehicle 100 may have a great deal of highly desirable information data to be shared, and six other vehicles 120 may also be at the light, having no or limited other data to share. If the autonomous vehicle 100 can share data both locally with the other vehicles and upload the data, it may process an upload using a first transceiver and send the remaining data to the other vehicles (concurrently or successively, depending on what the technology permits) to have the other vehicles complete the upload on its behalf.

Figure 4A:
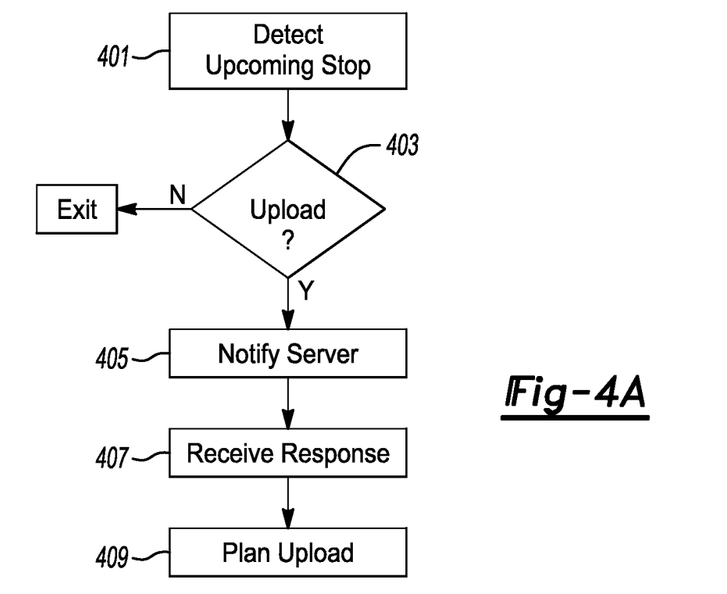
FIG. 4A shows an illustrative stop analysis process.

FIG. 4A shows an illustrative stop analysis process. In this example, the vehicle 100 again determines that a stop is upcoming at 401, such as in the example shown in FIG. 2. If an upload is planned for the stop at 403, the vehicle 100 may attempt to obtain bandwidth usage and other information about the access point, to determine if it is suitable for use, and how much bandwidth is expected to be available during the duration of communication between the vehicle 100 and the access point.

In this example, vehicle 100 may notify the server at 405, although it could also attempt to use V2V (direct or relayed) communication to a vehicle 120 already connected to the access point to determine the current usage (which may or may not be the same once vehicle 100 arrives). Once the vehicle 100 receives a bandwidth and other informational response at 407, it can proceed with planning a transfer at 409.

Figure 4B:
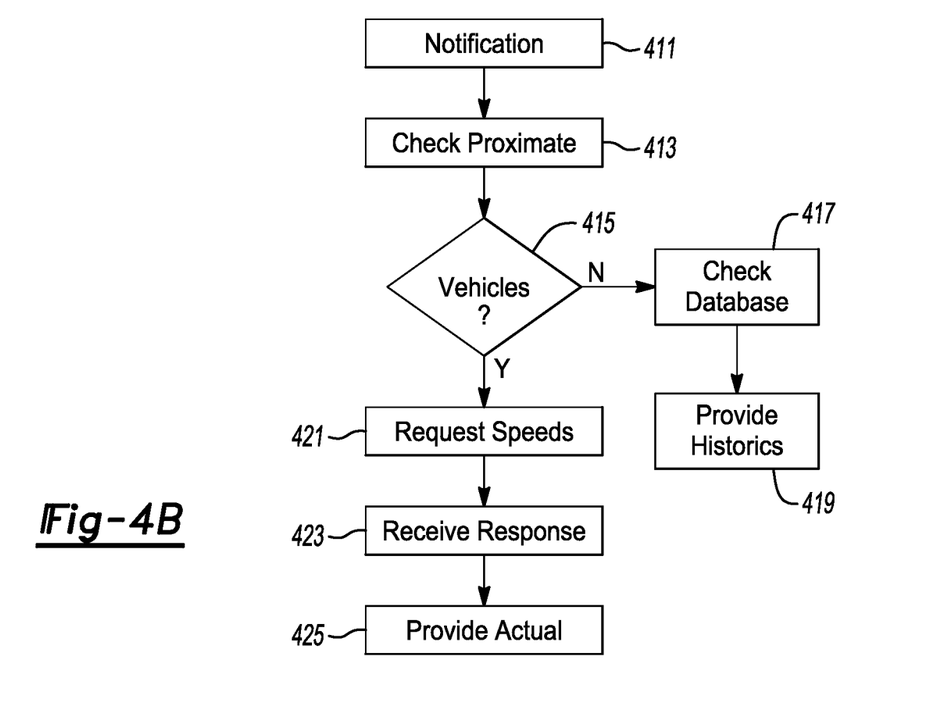
FIG. 4B shows an illustrative bandwidth analysis process.

FIG. 4B shows an illustrative bandwidth analysis process. This process occurs on the server, although aspects of this process may also be completable by a vehicle 120 that is closer in proximity to the access point than vehicle 100. The backend 140 receives the notification at 411 and checks a vehicle location database at 413 to determine if there are any vehicles 120 in communicable proximity to the access point. If there are no present vehicles 120, then the process may check a database of historic information at 417 and report historic speeds to vehicle 100 at 419, which can be a simple referential lookup (e.g., an average based on time and day of week) or a more complex statistical analysis based on having sufficient data to perform such an analysis.

When there are one or more proximate vehicles at 415, the backend 140 may request the actual present transfer speeds at 421, from those vehicles. The vehicles 120 may respond at 423, and the backend 140 can provide the current bandwidth data to the vehicle 100 at 425.

Vehicle 100 may also require credentials that may be stored by the backend, in order to access the access point. These can also be provided, and vehicle 120 can alternatively provide both the bandwidth information and the access credentials (if it already has them) over V2V transfer as an alternative.

Figure 5:
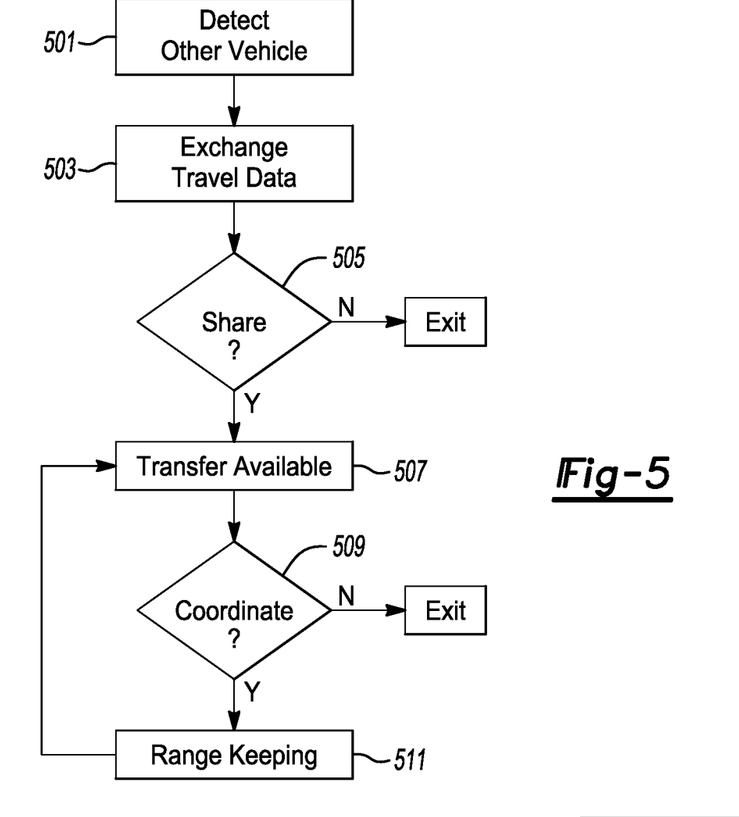
FIG. 5 shows an illustrative data handoff process.

FIG. 5 shows an illustrative data handoff process. In this example, vehicle 100 has data that needs to be uploaded, but is not traveling a route projected to bring it within range of an access point within a certain period of time. At the same time, vehicle 100 may encounter vehicle 120, which may presently have no data to transfer and may be projected to be near to an access point within less than the period of time. That is, regardless of how close or far vehicle 100 is from an access point, vehicle 120 may be able to complete the upload sooner. Even if vehicle 120 has its own data to transfer, vehicle 100 may have higher priority data or may simply not be expected to contact an access point for a long time (e.g., headed into a state park, where it will sit for four hours outside of cellular and Wi-Fi range), whereas vehicle 120 may be headed into a city where access to access points will be near perpetual. So, even though vehicle 120 has its own data, it still is projected to complete the transfer faster than vehicle 100. And, as before, if this projection proves to be incorrect, vehicle 100 can preserve the data until it is either informed the relay was successful or it uploads the data on its own.

Under the predicate of the vehicle 120 being projected to complete the transfer faster, in this example, vehicle 100 will transfer relevant information to vehicle 120. This transfer can be planned in advance by the backend, when it recognizes the efficiency opportunity noted, or, as in the example shown, it can be determined on-the-fly by two vehicles.

In the example, vehicles 100, 120 are sitting at a light, and vehicle 100 is going to turn left and head into the wilderness (from an access point perspective) while vehicle 120 is going straight ahead into a city rife with access points. Vehicle 100 detects vehicles 120 at 501 and the two vehicles exchange travel data at 503. Travel data can include, for example, intended paths and or a trail of breadcrumbs indicating proximate movement. For example, the two vehicles need not be stopped in proximity, but rather only need reach communication range of each other to make the initial data transfer. Without limitation, the vehicles could exchange 26 breadcrumbs (coordinates every 200 feet for the next mile) and the duration of time to a next access point (assuming that there wasn't one inside that mile).

Based on this initial data (or similar limited fast-transfer data), the vehicle 100 could determine that it shares a path with vehicle 120 for ¾ of a mile at 505, and then their paths diverge in the manner previously noted. The shared travel duration may provide sufficient time to transfer the data from vehicle 100 to vehicle 120. The additional data (next transfer point) may indicate that vehicle 120 will encounter an access point far sooner than vehicle 100. Based on these or similar predicates, vehicle 100 and vehicle 120 may agree to coordinate a data transfer at 509 so that vehicle 120 can send the data on behalf of vehicle 100. Accordingly, vehicle 120 and vehicle 100 may engage in cooperative travel at 511, keeping in range of each other until vehicle 100 has fully passed the data to vehicle 120, or until their routes diverge.

Figure 6A:
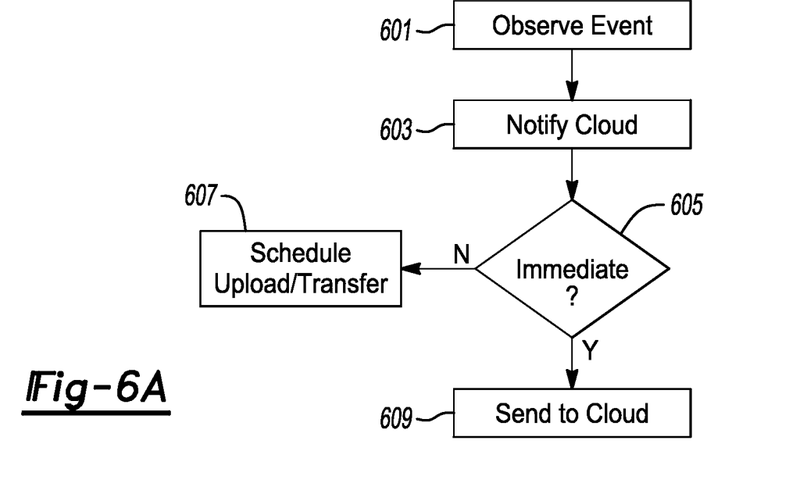
FIG. 6A shows an illustrative event detection handling process.

FIG. 6A shows an illustrative event detection handling process. This is another example of a potential transfer event, wherein vehicle 100 detects a high-urgency event (e.g., roadside fire or large pothole) or other important data. The vehicle 100 observes the event at 601 with a vehicle sensor and reports the observation to backend 140.

Certain events may be auto-flagged as immediately reportable without permission, e.g., the fire detected by an IR sensor or a pothole large enough to damage a wheel or axle, but other events may only periodically qualify as critical. The vehicle 100 notifies the cloud at 603 and either uploads the event immediately or asks for a classification of the data. If the cloud responds and classifies the data for immediate upload at 605, the vehicle 100 can use the cellular connection to upload the data. Otherwise, the vehicle 100 may schedule an upload or transfer at 607. The vehicle may also send a geographic or other low-bandwidth indicator of the event along with the classification request, which may then be responded to by the server with an indicator that the event is already known, and therefore no need for additional transfer of information is required. Alternatively, if the vehicle location was known and the server already knew of an event at or near that location, the server could simply choose to classify the data as non-critical, preventing unnecessary immediate transfer.

Whether or not the data is critical, the backend may assist in scheduling a transfer of the data. If the data is important, but not immediately needed, the backend can keep a record of the data priority, so that vehicle 100 can be given precedence over some other vehicle 120 if they both arrive at a limited-use access point. The server can also append a flag to the data or vehicle, so that the two vehicles 100, 120 can recognize the priority of vehicle 100 even in the absence of additional server assistance or instruction. Once the data is sent to the server, this indicator can be deleted.

The backend may assist with mass scheduling of data transfer as well. Connected vehicles can communicate high-level data summaries to the cloud, which can use many summaries and known planned routes to determine what data should be prioritized for immediately sending to the cloud (over cellular), what data should be sent over a partnering Wi-Fi access point (in the near future), and what data can wait until the vehicle ends the trip and goes back to its home location (to send over the home Wi-Fi network). This coordination can help ensure that the most important data is sent to the cloud, but the high volume of data is not unnecessarily sent multiple times when multiple vehicles observe the same event. That is, the cloud can coordinate for selected vehicles to send duplicative (with other non-selected vehicles) high volume sensor data over Wi-Fi networks near which those selected vehicles will stop, avoiding the other non-selected vehicles (that will not pass a Wi-Fi network) having to send similar data over cellular.

Figure 6B:
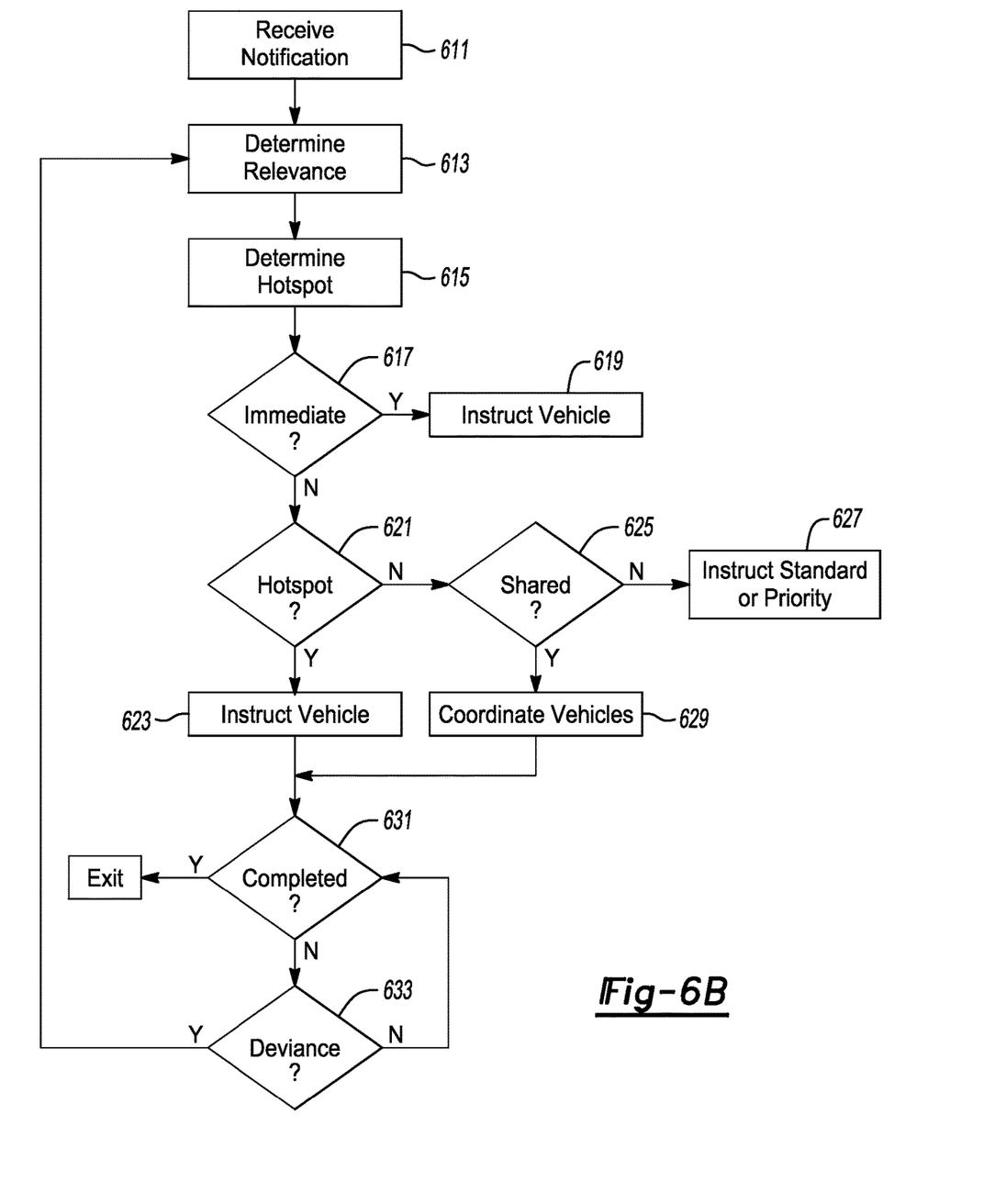
FIG. 6B shows an illustrative event detection reporting planning process.

FIG. 6B shows an illustrative event detection reporting planning process. In this example, the backend will instruct a vehicle 100 how to handle a detected event. This process may not apply to every detected event or dataset (or it may), but in the example cited, it will apply to data of certain types or characterizations. For example, there may be a preset set of OEM definitions of "always critical" data, such as the fire and/or large pothole examples. There may also be temporarily critical data, which can include, for example, slowdowns of more than 90% on a highway during temporal proximity to rush-hour. It may be the case that the backend always wants data such as this immediately reported, as it is highly useful to a large number of vehicles. Moreover, in the particular example cited, the massively-slowed vehicle is unlikely to reach an access point any time soon, unless they are deployed near to the highway as infrastructure or in a highway-adjacent business. At the same time, once the data is on the server from one observation, the server can also instruct other vehicles not to transfer the data through various methods, to avoid redundant transfer.

The server may also define temporarily critical data, such as wheel slippage during a winter storm, wherein certain slippage events are always reported. This temporary classification can be distributed to vehicles so that they know to report data of certain types when detected. The vehicle may also report a limited size subset (e.g., a short-string classifier and a location—"slip, X, Y") and may reserve a more robust data report for an encounter with an access point (comprehensive sensor data, observed overall area of iciness, etc.).

In still further examples, the backend 140 may decide that certain data is relevant, which is the case in the example shown, wherein the backend determines the relevance of a detected instance. Even here, the reporting of certain possibly-critical instances may be limited to certain data types or data values far outside expected values (e.g., during rain, camera visibility reduced to four feet). This limiting may occur to avoid vehicles 100 reporting (even just as a cursory report) every detection-instance that occurs.

The backend 140 may receive a notification at 611 that includes some limited amount of information about what was detected, which may include, for example, sensor used, type of data, indication of degree past threshold, etc. It may be possible to report characteristics of much of the detected data while using limited bandwidth, and only report the substance of the data when instructed to do so.

If the backend determines that the data is relevant at 613, the backend may also determine how proximate a nearest hotspot is to the vehicle 100 at 615. For example, if vehicle 100 is traveling at 60 miles per hour along a route that will bring it within range of a hotspot within 1 minute, it may not be worth the cellular overhead to transfer the data immediately, when the information can be had 1 minute later for a much lower cost, or for free/faster/etc. This consideration may also take into account any bandwidth constraints on any hotspots, so that the backend can provide instruction with some assurances about when the data will be received, if those assurances are needed.

If there is no reasonable quick transfer of the data available and the need for the data is immediate or near-immediate at 617, the backend may instruct immediate transfer at 619. Immediate transfer could refer to a rather large set of data, depending on what the situation was. For example, a truck fire may occur at 4 AM on a road that experiences high daily traffic. At that moment in time, only a single vehicle 100 may be routed down an alternative road for which there is limited data available. The backend also knows, however, that significant traffic will soon be arriving and will likely be routed down that same alternative road for some time, and so it may instruct vehicle 100 to report any anomalous data immediately, so it can build a better picture of the conditions of the road in advance of the arrival of much more traffic. This can allow it to advise that traffic and even shunt traffic to alternative routes if needed, and even though much of the data gathered by vehicle 100 would typically be "common" data that would be reported in due course, but not with special dispatch, in this instance the backend may deem all that data critical, given the impending arrival of the traffic.

If the data is not deemed suitable for immediate reporting, the backend 140 may determine if there is a hotspot upcoming along a vehicle route, or upcoming within a threshold period of time. If there is no hotspot or no hotspot within X miles/minutes at 621, the backend may look for a handoff vehicle to perform a relay transfer at 625 as in FIG. 5. If no such vehicle 120 can be found, for example, if there are no other vehicles or no other vehicles that vehicle 100 will intersect that have an expected encounter within X miles/minutes, the backend may simply assign a priority to the data at 627 or instruct vehicle 100 to handle the data in accordance with already established priorities and onboard protocols (e.g., queue for handling when an access point is available).

If there is a vehicle 120 that will reach an access point within a threshold, or at least sooner than vehicle 100, then the process may coordinate the travel at 629 of the two vehicles 100, 120 to keep them in proximity long enough to handle data exchange. This might involve a reroute to one of the vehicles, but many reroutes can be accomplished with limited impact on travel time. Whether or not to reroute can be a function of user-agreements (when the vehicles are autonomous) or can be provided as an option (possibly including a small credit) when the vehicle is driven by a human.

If there is a hotspot at 621, the backend instructs the vehicle 100 to queue certain data for transfer at 623. This can be a server assisted planning process or an onboard process, similar to FIG. 2, and may be delayed until the vehicle 100 is within a certain distance of the access point. Until the transfer is completed at 631, the backend may monitor the progress of the vehicle 100 or the handoff vehicle 120 for a deviance at 633, such as an unplanned turn or stoppage. This may cause a re-evaluation of whether the data should be transferred immediately—e.g., if the server expected to receive the data within 5 minutes, but then the vehicle 100 deviated routes to a new plan with no hotspots for an hour, the backend may decide this is too long to wait for the information.

By coordinating the efforts of thousands of vehicles and strategically planning hotspot usage and when to transfer, assist in transfer and/or not-transfer data, the illustrative examples provide an advanced data reporting system capable of using infrastructure much more effectively.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
a processor configured to:
determine that a stop is upcoming along a route of a first vehicle;
determine that the upcoming stop will place the first vehicle within range of a wireless transceiver;
approximate a predicted transfer rate of the wireless transceiver;
determine if data onboard the first vehicle is to be uploaded, based on at least a size of the data, a priority assigned to the data and the predicted transfer rate;
determine a predicted duration of communication between the first vehicle and the transceiver based on the route and the upcoming stop;
determine a first predicted amount of data able to be transferred based on the predicted duration and the predicted transfer rate;
responsive to determining that data is to be uploaded, designate first data for upload based on the first data having a size that is below the first predicted amount; and
responsive to the first vehicle establishing communication with the wireless transceiver, begin transferring the designated data.

2. The system of claim 1, wherein the processor is configured to determine that the stop is upcoming based on data wirelessly provided by a signal, instructing the stop.

3. The system of claim 1, wherein the processor is configured to determine that the stop is upcoming based on previously stored timing data for a signal, instructing the stop, and based on a present state of the signal provided by a second vehicle reporting the present state.

4. The system of claim 1, wherein the processor is configured to approximate the predicted transfer rate based on a second vehicle, connected to the transceiver, reporting a present transfer rate.

5. The system of claim 1, wherein the expected duration of communication is based on at least a predicted duration of the stop and a predicted impact of traffic on travel of the first vehicle while the first vehicle is in communication with the transceiver.

6. The system of claim 1, wherein the designated first data is designated from a plurality of possible data candidates, each having a size below the first predicted amount, based additionally on the first data having a priority equal to or higher than a highest priority assigned to other of the possible data candidates.

7. The system of claim 1, wherein the processor is further configured to:
determine, after establishing communication with the wireless transceiver, a new predicted amount of data less than the first amount and less than the size of the first data, and responsively designate new data for upload based on the new data having a size that is below the new predicted amount of data.

8. The system of claim 1, wherein the processor is further configured to:
determine, after establishing communication with the wireless transceiver, a new predicted amount of data less than the first amount and less than the size of the first data, and responsively wirelessly transfer at least a portion of the first data to a second vehicle in communication range of the first vehicle.

9. A first vehicle comprising:
a processor configured to:
wirelessly receive route data from a second vehicle indicating both a shared portion of an upcoming route of the first vehicle and a deviance, after the shared portion, from the upcoming route;
determine, based on the received route data, that the deviance will bring the second vehicle within communicable range of first known wireless transceiver sooner than the first vehicle will come within communicable range of a second known wireless transceiver; and wirelessly transfer data, designated for upload, from the first vehicle to the second vehicle responsive to the determination.

10. The first vehicle of claim 9, wherein the processor is further configured to:
further condition the wireless transfer of data based on a second determination that the shared portion of the upcoming route will keep the first and second vehicles in communicable proximity for sufficient duration to complete wireless transfer of the data.

11. The first vehicle of claim 10, wherein the processor is further configured to:
coordinate with the second vehicle, responsive to the second determination, to control the first vehicle to remain in the communicable proximity over travel along the shared portion, at least until the wireless transfer of the data is complete or the second vehicle reaches the deviance.

12. The first vehicle of claim 9, wherein the processor is further configured to:
further condition the wireless transfer of data based on receipt of confirmation from the second vehicle that the second vehicle will accept the data.

13. The first vehicle of claim 9, wherein the processor is further configured to:
receive notification from a remote server that the second vehicle successfully uploaded the data and responsively delete the data from a memory of the first vehicle.

14. A system comprising:
a processor configured to:
determine that a first vehicle includes first data designated for upload;
determine that a first and second vehicle will travel in communicable proximity to each other for at least a duration sufficient to wirelessly transfer the first data from the first vehicle to the second vehicle, based on route data of the first and second vehicles; and
determine that the second vehicle will travel within communicable range of first known wireless transceiver sooner than the first vehicle will come within communicable range of a second known wireless transceiver, based on the route data, and responsively instruct the first vehicle to transfer the first data to the second vehicle when the first vehicle is within communicable proximity to the second vehicle.

15. The system of claim 14, wherein the processor is further configured to:
determine that the second vehicle will be able to complete upload of the data using the first known wireless transceiver; and
further condition instructing the first vehicle based on the determination that the second vehicle will be able to complete the upload.

16. The system of claim 15, wherein the determination that the second vehicle will be able to complete upload is based at least in part on a size of the data and a projected transfer speed of the first wireless transceiver.

17. The system of claim 15, wherein the determination that the second vehicle will be able to complete upload is based at least in part on a size of the data and a projected duration of communication between the second vehicle and the first wireless transceiver.

18. The system of claim 15, wherein the determination that the second vehicle will be able to complete upload is based at least in part on a size of the data, a projected transfer speed of the first wireless transceiver, and a projected duration of communication between the second vehicle and the first wireless transceiver.

19. The system of claim 15, wherein the processor is further configured to:
determine a predicted amount of data uploadable by the second vehicle using the first transceiver based at least in part on a size of the data, a projected transfer speed of the first wireless transceiver, and a projected duration of communication between the second vehicle and the first wireless transceiver; and
instruct the first vehicle transfer additional data to the second vehicle, responsive to the first data being smaller than the predicted amount, the first vehicle including second data designated for upload, and the duration additionally being sufficient to wirelessly transfer the second data from the first vehicle to the second vehicle after transferring the first data.

20. The system of claim 19, wherein the instructing to transfer the additional data is further responsive to a size of the second data and the first data combined being less than the predicted amount.

* * * * *